(12) United States Patent
Schumacher et al.

(10) Patent No.: US 9,901,022 B2
(45) Date of Patent: Feb. 27, 2018

(54) SEEDING HEART WITH A MODULAR AGITATOR SHAFT FOR SEED

(71) Applicant: Kverneland AS, Kvernaland (NO)

(72) Inventors: Ferdinand Schumacher, Lippetal-Oestinghausen (DE); Bernhard Scheideler, Beverungen (DE)

(73) Assignee: Kverneland AS, Kvernaland (NO)

( * ) Notice: Subject to any disclaimer, the term of this patent is extended or adjusted under 35 U.S.C. 154(b) by 0 days.

(21) Appl. No.: 15/035,650

(22) PCT Filed: Jan. 29, 2015

(86) PCT No.: PCT/EP2015/051846
§ 371 (c)(1),
(2) Date: May 10, 2016

(87) PCT Pub. No.: WO2015/165598
PCT Pub. Date: Nov. 5, 2015

(65) Prior Publication Data
US 2016/0270287 A1    Sep. 22, 2016

(30) Foreign Application Priority Data
May 2, 2014  (EP) .................................... 14166850

(51) Int. Cl.
*A01C 7/04*     (2006.01)
*A01C 7/20*     (2006.01)

(52) U.S. Cl.
CPC ............... *A01C 7/046* (2013.01); *A01C 7/20* (2013.01); *A01C 7/205* (2013.01)

(58) Field of Classification Search
CPC combination set(s) only.
See application file for complete search history.

(56) References Cited

U.S. PATENT DOCUMENTS

| | | | |
|---|---|---|---|
| 4,162,744 A * | 7/1979 | Barker | A01C 7/04 111/77 |
| 4,469,244 A | 9/1984 | Maury | 221/200 |
| 4,688,698 A | 8/1987 | Holland | 221/211 |
| 4,793,511 A * | 12/1988 | Ankum | A01C 7/046 111/77 |

(Continued)

FOREIGN PATENT DOCUMENTS

| | | | |
|---|---|---|---|
| EP | 0 046 709 | 3/1982 | ............... A01C 7/04 |
| EP | 0 145 237 | 6/1985 | ............... A01C 7/04 |

OTHER PUBLICATIONS

International Search Report from corresponding International Patent Application No. PCT/EP2015/051846, dated Apr. 28, 2016.

*Primary Examiner* — Alicia Torres
(74) *Attorney, Agent, or Firm* — Kusner & Jaffe (57) ABSTRACT

A seeding heart for a single-grain seeding machine comprising a seeding disc rotatable in a rotational direction (R) with a large number of seeding holes distributed concentrically with respect to the seeding disc along at least one seeding hole circle and at least one agitator shaft for the movement of the seed, said agitator shaft being disposed in a holding section for holding the seed on the seeding holes of the seeding disc, characterised in that the agitator shaft is constituted replaceable in a modular manner. A single-grain seeding machine including the seeding heart.

15 Claims, 5 Drawing Sheets

(56) References Cited

U.S. PATENT DOCUMENTS 5,784,985 A * 7/1998 Lodico ................. A01C 7/04
                                                  111/184
6,352,042 B1 * 3/2002 Martin ................. A01C 7/046
                                                  111/184

* cited by examiner

SEEDING HEART WITH A MODULAR AGITATOR SHAFT FOR SEED

FIELD OF THE INVENTION

The present invention relates to a seeding heart and a single-grain seeding machine.

BACKGROUND OF THE INVENTION

Seeding hearts for single-grain seeding machines are used for the defined delivery of seed, wherein the seed usually does not have any defined size. Moreover, seeding hearts should be capable of being used as universally as possible for a large number of seed types of differing size and geometrical shape. Since the seed is sometimes very expensive, as little seed reject as possible should be produced and if possible no seed should be destroyed. A major role is also played by the delivery at a defined distance and of one single seed grain at a time, in order that the plants can develop in the optimum manner up to harvesting.

For the reliable singling of seeds on seeding holes of a rotating seeding disc, moreover, it is important that a long-term and destruction-free use is ensured. Problems arise not only due to the aforementioned different sizes, but also due to dust and any contamination or foreign bodies, which with generic seeding hearts are often shown to be responsible for malfunctions, in particular in the case of a longer operation.

The problem of the present invention, therefore, is to provide a seeding heart which can be used in a versatile manner and operates reliably, i.e. as far as possible disruption-free over as long a period as possible.

This problem is solved with. the features of the independent claim(s). Advantageous developments of the invention are stated in the sub-claims. All combinations of at least two features stated in the description, the claims and/or the figures fall within the scope of the invention, Insofar as value ranges are stated, any intermediate values should also be deemed to be disclosed as limiting values.

SUMMARY OF THE INVENTION

The basic idea of the present invention is to arrange an agitator shaft in a holding section for holding the seed on the seeding disc or in the region of an inlet of the seed into the seeding heart and to constitute the agitator shaft so as to be replaceable in a modular manner. Replaceable in a modular manner means in particular that the seeding heart does not have to be dismantled to replace the agitator shaft. Seeding hearts are usually constituted in two parts and comprise a large number of add-on parts, which have to be used in an expensive way in the case of dismantling and subsequent assembly. Replaceable in a modular manner means in particular that the seeding heart does not have to be dismantled from the single-grain seeding machine for the replacement of the agitator shaft. This is especially advantageous, because a single-grain seeding machine usually comprises a large number of seeding hearts, i.e. at least one seeding heart per seeding row.

As a result of the modular structure, it is possible according to the invention to easily replace the agitator shaft in the event of wear without having to carry out expensive dismantling of the seeding heart from the single-grain seeding machine and/or taking apart the seeding heart. Moreover, different agitator shafts can be used for different seed, which comprise in particular different external contours, preferably different agitator nubs at the periphery.

According to a preferred embodiment of the invention, provision is made such that the agitator shaft can be slipped onto a drive shaft which in particular is coupled with a drive of the seeding disc, preferably via a bevel gear. As a result of the coupling with the drive shaft, the structural outlay for the seeding heart is reduced, since an independent drive for the agitator shaft can be dispensed with.

In a development, it is conceivable according to the invention to dispose the drive shaft rotatably with a double ball bearing in a hollow cylinder formed in particular in a housing half of the seeding heart. In this way, the agitator shaft can be mounted at least predominantly, in particular exclusively, on its drive end, so that the modular replacement, in particular from the opposite end of the drive shaft, is simplified.

In particular, the drive shaft has only one degree of freedom in the rotation direction, preferably by a form-fit insertion into the hollow cylinder.

According to a further advantageous embodiment of the present invention, provision is made such that the agitator shaft can be replaced through a housing opening of the seeding heart disposed in particular lying opposite to the hollow cylinder. In this way, the agitator shaft can be replaced in a straightforward manner, in particular by a linear slip-on motion.

According to a further embodiment of the invention, the agitator shaft can be advantageously fixed rotatably by means of a cover which in particular closes the housing opening, preferably in a sealing manner. A simple replacement is thus enabled, wherein the cover can in particular perform a number of functions simultaneously, i.e.:

a) closing the housing opening, in particular in a sealing manner with respect to the surroundings and/or
b) holding the agitator shaft in a slip-on direction of the agitator shaft or in the axial direction of the drive shaft and/or
c) guiding an end face of a head of the agitator shaft and thus stabilising, in particular, the free end of the agitator shaft that is remote from the drive side.

According to a further aspect of the invention, the agitator shaft comprises, in particular, a circular cylindrical head constituted form-congruent with an inner wall of the housing opening. As a result of the form congruence of the head, the holding section of the seeding heart comprising the seed can be closed. The head is disposed in particular on a shoulder directed towards the drive side of the agitator shaft, said shoulder being flush with an inner wall of the seeding heart, in particular in the region of the holding section. In particular, the head has a clearance with respect to the inner wall of the housing opening, and in particular is rotatable with respect to the latter. The clearance is preferably dimensioned such that no seed can get jammed between the inner wall of the housing opening and the head.

The assembly of the agitator shaft is thus enabled in a straightforward manner, with a simultaneously reliable operation of the agitator shaft over a long period.

As an alternative or in addition to an adjustable stripper as an actuating element for influencing the occupancy of the seeding holes, it is conceivable in one embodiment according to the invention that the actuating elements comprise at least one agitator shaft for the movement of the seed, said agitator shaft being disposed in a holding section for holding the seed on the seeding disc. A movement of the seed taking place in addition to the natural movement of the seed along the seeding disc, in particular running normal thereto, leads to a better occupancy of the seeding holes, in particular in the case of an under-occupancy. In this case, the speed of the agitator shaft can in particular be increased. In particular, an axle of the agitator shaft runs in the radial direction to the seeding disc and parallel to a flat side of the seeding disc. In particular, an agitator section of the agitator shaft is disposed in a storage region of the seeding heart, preferably in the region of an inlet of the seed.

In a further advantageous embodiment, the actuating elements comprise, as an alternative or in addition to the adjustable stripper and/or the agitator shaft, a blower motor for generating an underpressure on the seeding holes. According to the invention, the underpressure present at the seeding holes for holding the seed on the seeding holes can be controlled by controlling the blower motor. If an under-occupancy is ascertained by an evaluation unit, the underpressure is increased and, in the case of an over-occupancy, the underpressure is reduced, in particular in the region of an ascertained underpressure region (corridor), in particular related to the given seed.

According to the invention, a combination of the adjustable stripper, the agitator shaft and the control of the blower motor is preferably provided, so that control priorities can in particular be established and/or a control sequence in the case of an under-occupancy and/or an over-occupancy of individual seeding holes, preferably in each case separately, can be ascertained, preferably dependent on the given seed.

Furthermore, the present invention relates to a single-grain seeding machine with one or more of the above-described agitator shafts.

Further advantages, features and details of the invention emerge from the following description of preferred examples of embodiment and on the basis of the drawings.

BRIEF DESCRIPTION OF THE DRAWINGS

FIG. 2b shows a side view of the seeding heart according to FIG. 2a with an open seeding heart and FIG. 2c shows a cut-away plan view of the seeding heart according to FIG. 2a.

Identical components and components with the same function are denoted by the same reference numbers in the figures.

DETAILED DESCRIPTION OF THE INVENTION

Figure 1A:
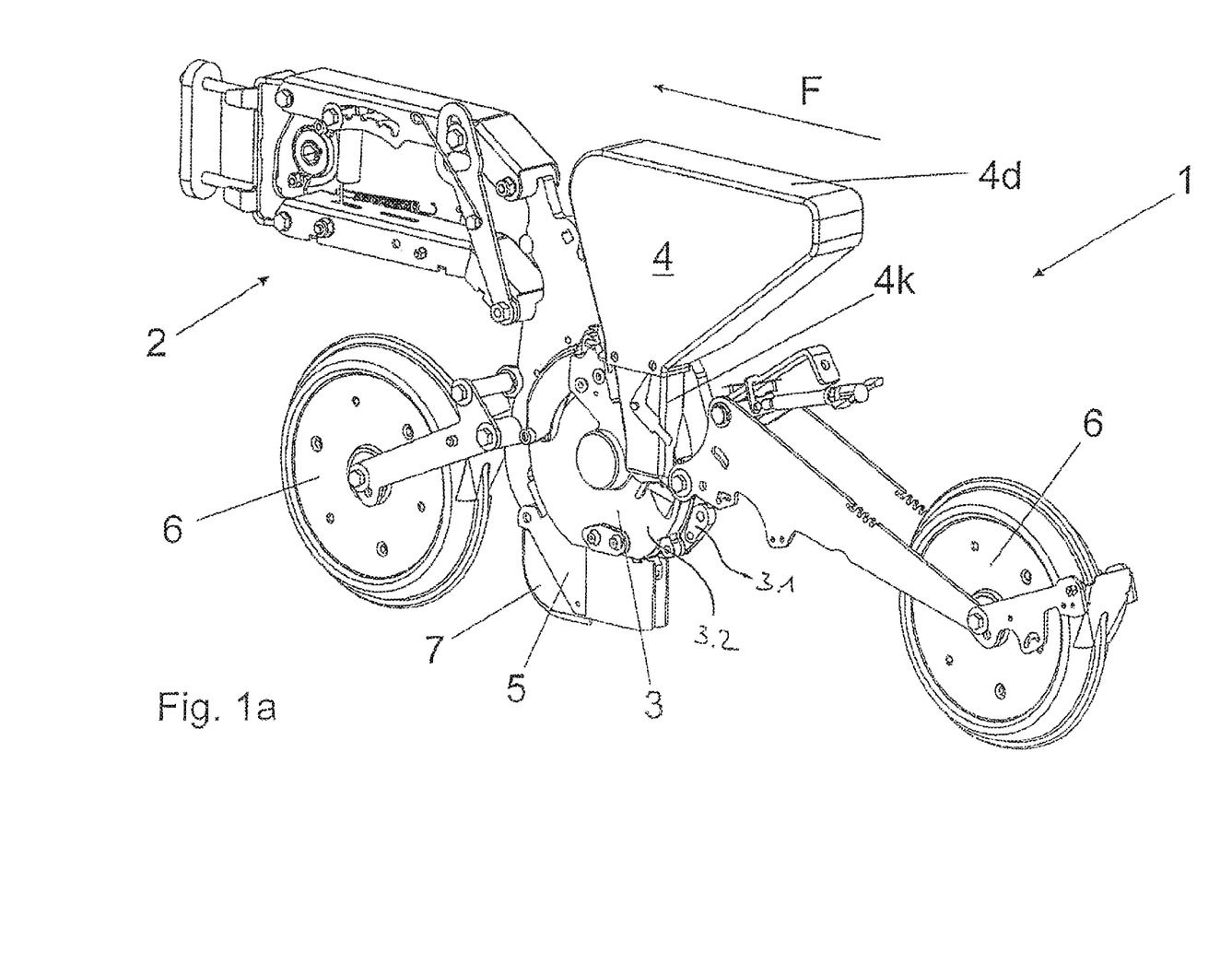
FIG. 1a and 1b show, in the travel direction obliquely from the rear (FIG. 1a) and obliquely from the front (FIG. 1b), perspective views of an embodiment of a single-grain seeding unit of a generic sin grain seeding machine with a seeding heart.
Figure 1B:
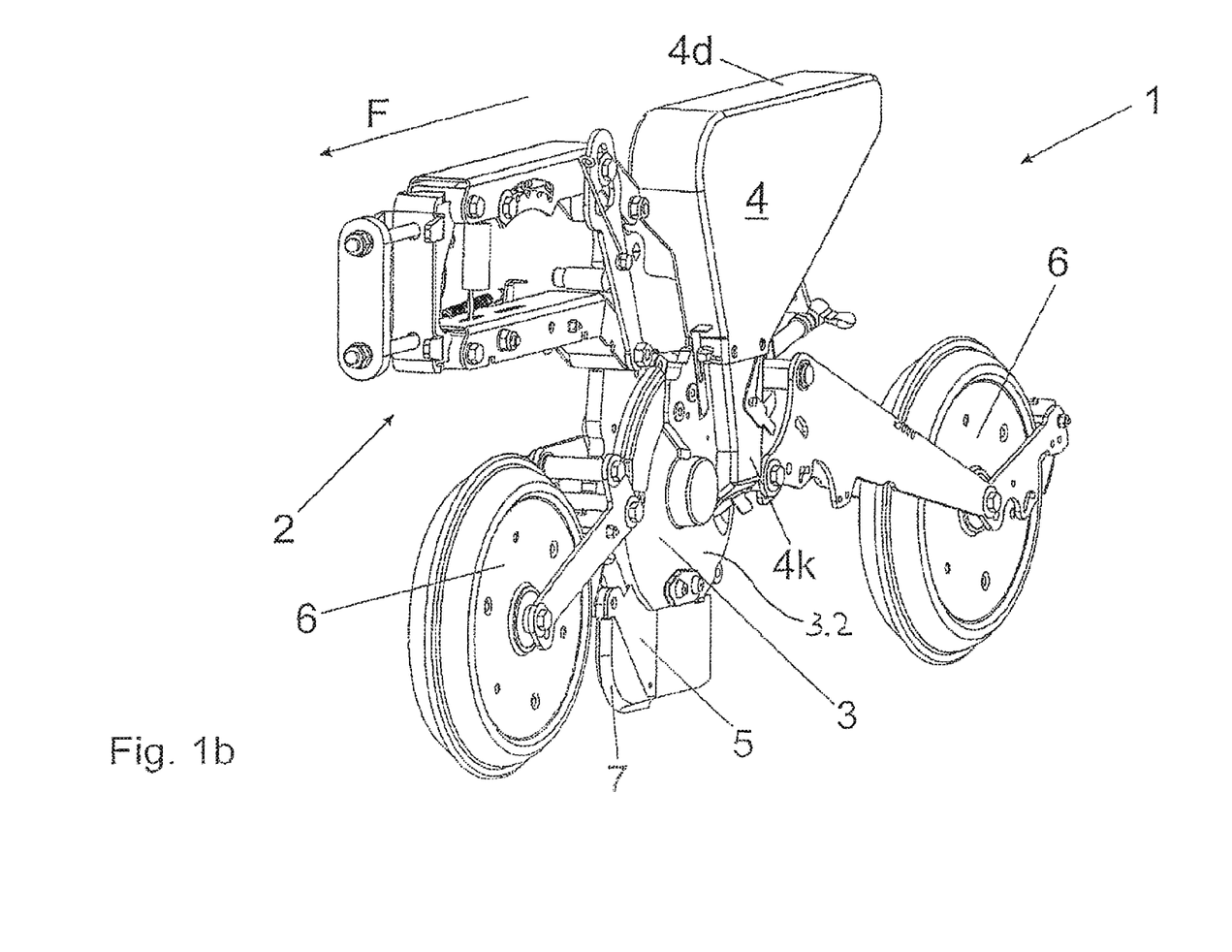

FIGS. 1a and 1b represent a seeding unit 1 of a single-grain seeding machine according to the invention, said seeding unit being fastened via an arm 2 on the frame of the single-grain seeding machine. Accordingly, the travel direction is in the direction indicated by arrow F during the operation of the single-grain seeding machine.

A seeding heart 3, a tank 4 disposed above seeding heart 3, a sowing coulter 5 disposed below seeding heart 3 as well as two running wheels 6 swivellable with respect to seeding heart 3 and disposed before and after seeding heart 3 in travel direction F are fitted to arm 2, which permits a swivelling movement, preferably as a vertical movement due to the constitution of arm 2 as a parallelogram arm. Tank 4 can be closed by means of a cover 4d and filled with seed, which in turn is guided via a channel 4k laterally into seeding heart 3.

The seed is singled in seeding heart 3 and deposited via seeding coulter 5 into a furrow in the farmland opened by coulter tip 7 of sowing coulter 5.

Seeding heart 3 comprises a first half 3.1 and a second half 3.2, which define a seeding heart housing and a working chamber 8 located therein. Working chamber 8 is divided by a seeding disc 9 into a pressure side and a seed side.

Seeding holes 15 are distributed at the periphery of seeding disc 9 concentric with circular seeding disc 9 (seeding hole circle), through which seeding holes the pressure side and the seed side are connected. The pressure side and the seed side are otherwise sealed off from one another by seeding disc 9 and in particular by corresponding seals.

In half 3.2, the seed from tank 4 arrives via an inlet 30 into a holding section 31 for holding the seed on seeding disc 9. At least in holding section 31, an underpressure is present on seeding holes 15, which underpressure is generated by an underpressure region of first half 3.1. Connected to the underpressure region is a blower motor, which can be controlled by a seeding heart control device.

Seeding holes 15, depending on the seed to be singled, have suitable diameters which lie in particular in the range from 0.5 mm to 3 mm.

Each seeding hole 15 ideally holds a single grain, which does not always work 100% in practice particularly due to the different forms of the grains of each seed. Depending on the seed used and depending on the adjustment of seeding heart 3 and the travel speed, it happens that a seeding hole 15 does not hold any grain or even a plurality of grains. The effect of this at the corresponding seeding point in the farmland is that either no plants emerge or for example two plants, which are not supplied with sufficient nutrients and therefore remain underdeveloped.

It is particularly critical, however, if individual seeding units of a single-grain seeding machine completely fail, for example due to a malfunction or a high degree of soiling.

An agitator shaft 18, 18' comprising agitator nubs 19, 19' for intensifying the movement of the seed in holding section 31 is preferably disposed in the region of inlet 30 and/or at the start of holding section 31 lying in rotational direction R.

The region of inlet 30 is provided in particular with a level monitoring system (not represented) in order to counteract an excessive conveying effect of agitator shaft 18, 18'. If the level monitoring system emits a corresponding signal that no seed or too little seed is present in the region of inlet 30, the speed of agitator shaft 18, 18' is reduced or the rotation of agitator shaft 18, 18' is stopped.

A stripper (not represented) for stripping excessive seed from seeding holes 15 is disposed, in rotational direction R, preferably between agitator shaft 18, 18' and a seeding heart monitoring device (not represented), in particular closer to agitator shaft 18, 18' than to the seeding heart monitoring device.

Figure 2A:
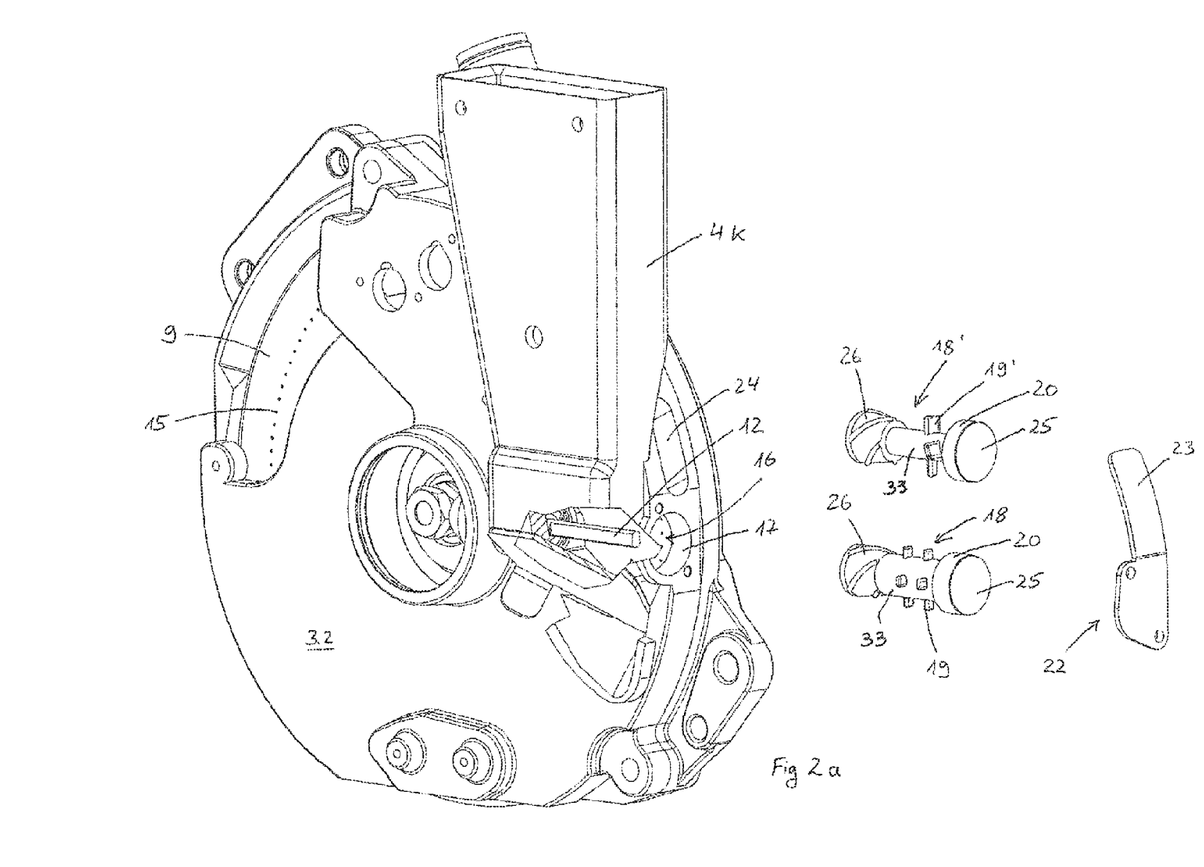
FIG. 2a shows a perspective view of the seeding heart of the embodiment according to FIG. 1 with a cut-away section to illustrate an agitator shaft and a partially represented seeding disc with seeding holes.
Figure 2B:
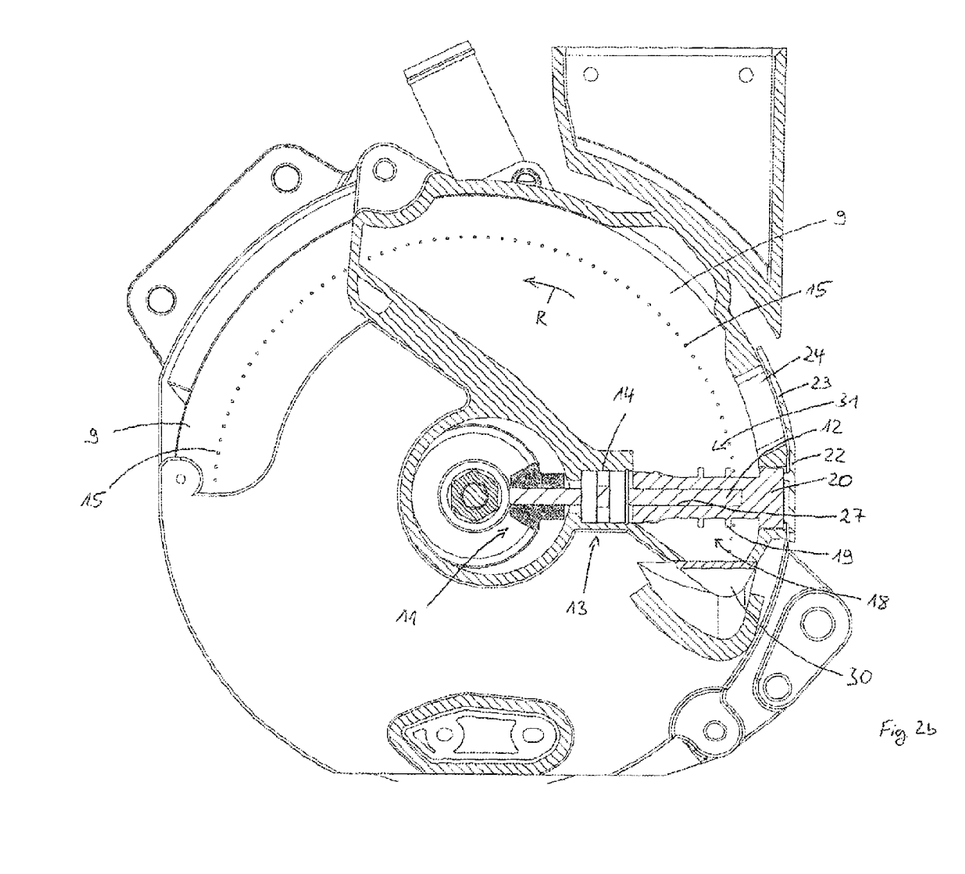
Figure 2C:
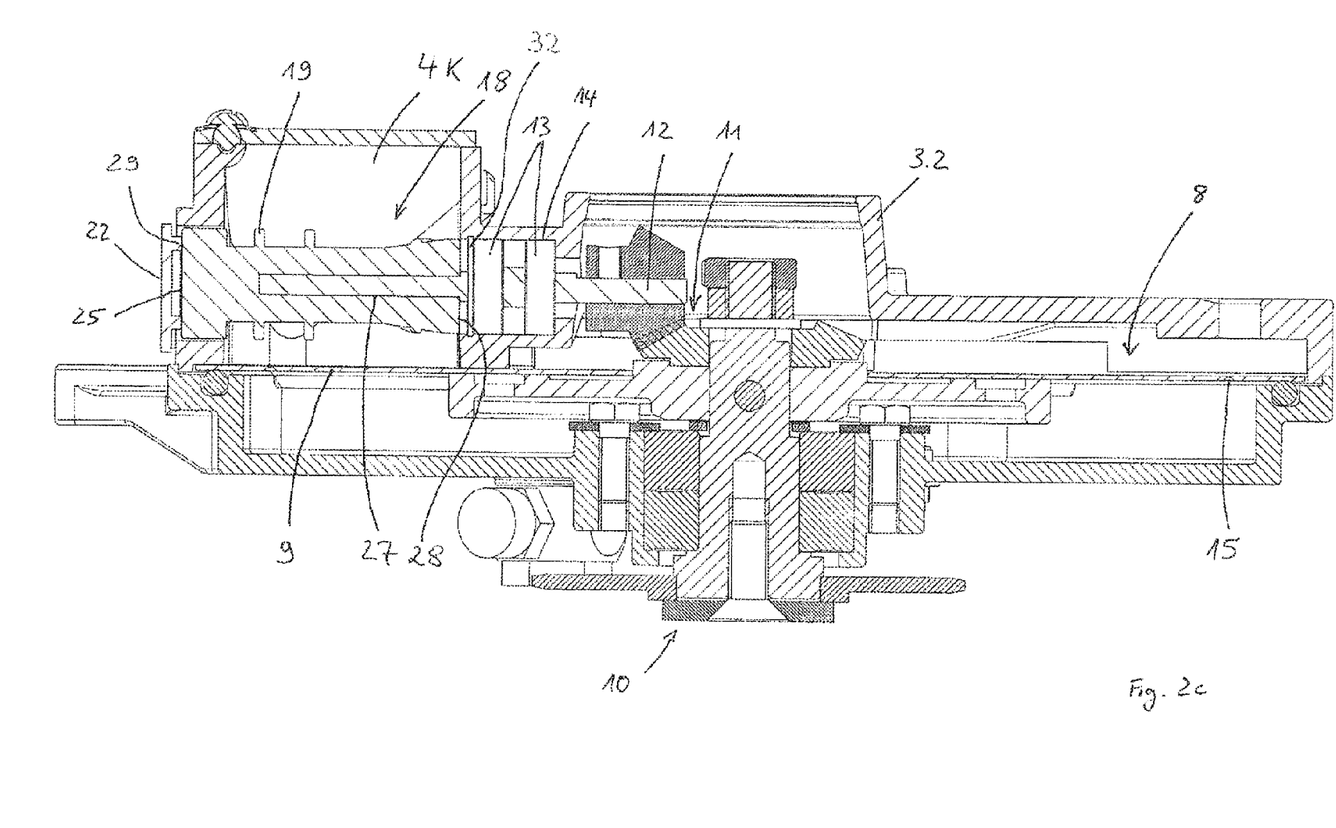

It can be seen from FIG. 2a that, according to the invention, agitator shafts 18, 18' of different embodiments can be inserted into seeding heart 3. The embodiment of lower agitator shaft 18 comprises agitator nubs 19 at its periphery 33, said agitator nubs differing in shape and size from agitator nubs 19 of agitator shaft 18' represented in FIG. 2a. The four agitator nubs 19' disposed at the periphery 33 of agitator shaft 18' have a wing shape. Apart from the number, shape and size of agitator nubs 19, 19' and/or the diameter of the hollow body comprising agitator nubs 19, 19' at its periphery, agitator shafts 18, 18' are preferably identical.

In an optional embodiment, the two agitator shafts 18, 18' comprise a screw 26 at a drive end. Screw 26 assists in conveying the seed in the direction of agitator nubs 19, 19' during rotation of agitator shaft 18, 18'. Agitator nubs 19, 19' provide a turbulence of the seed in holding section 31.

Agitator shaft 18, 18' is constituted at least partially, preferably predominantly, as a hollow body with a receiving opening 27 for receiving a drive shaft 12. Agitator shaft 18, 18' can be slid axially with its receiving opening 27 onto drive shaft 12 and has only one degree of freedom in the slip-on direction. Agitator shaft 18, 18' is thus connected non-rotatably to drive shaft 12.

At stop side 28 surrounding receiving opening 27, agitator shaft 18, 18' strikes against a stop ring 32 of a hollow cylinder for holding a double ball bearing 13 of drive shaft 12, in particular in a sealing manner. This thus prevents seed from passing from holding section 31 into a drive chamber of a drive 10 for driving seeding disc 9.

Drive shaft 12 runs in particular radially parallel to seeding disc 9 and/or orthogonal to a drive shaft of drive 10 for driving seeding disc 9. Drive shaft 12 is coupled in particular via a bevel gear 11 to drive 10, so that agitator shaft 18, 18' also rotates during the operation of seeding disc 9, i.e. during rotation of seeding disc 9.

Alternatively, an independent drive is provided for the drive of drive shaft 12, said drive in particular being separately controllable and/or regulatable.

At the free end of agitator shaft 18, 18', the latter comprises a head 20 with a circular cylindrical periphery, which is formed congruent with a housing opening 16 of seeding heart 3. Head 20 has in particular a clearance with respect to an inner wall 17 of housing opening 16, so that agitator shaft 18, 18' can be removed through housing opening 16 in a slip-on direction running axially with respect to drive shaft 12.

Housing opening 16 can be closed with a cover 22, in particular in a sealing manner. Cover 22 fixes agitator shaft 18, 18' on drive shaft 12 by means of at least one, in particular annular, projection 29. Projection 29, in the assembled state, lies on an end face 25 of agitator shaft 18, 18' running in particular tangential to seeding disc 9 and/or radial to drive shaft 12. Cover 22 thus simultaneously stabilises the rotary motion of the free end of agitator shaft 18, 18'.

Cover 22 further comprises an inspection window 23, which closes an inspection opening 24 of seeding heart 3. A view inside the operation of seeding heart 3 in the interior seeding heart 3 is obtained through inspection opening 24 and inspection window 23.

LIST OF REFERENCE NUMBERS 1 seeding unit
2 arm
3 seeding heart
3.1 half
3.2 half
4 tank
4d cover
4k channel
5 sewing coulter
6 running wheels
7 coulter tip
8 working chamber
9 seeding disc
10 drive
11 bevel gear
12 drive shaft
13 double ball bearing
14 hollow cylinder
15 seeding holes
16 housing opening
17 inner wall
18, 18' agitator shaft
19, 19' agitator nubs
20 head
21 end face
22 cover
23 inspection window
24 inspection opening
25 end face
26 screw
27 receiving opening
28 stop side
29 projection
30 inlet
31 holding section
32 stop ring
33 periphery
R rotational direction
F travel direction Having described the invention, the following is claimed:

1. A seeding heart for a single-grain seeding machine comprising:
    a holding section for holding seed received from a tank,
    a seeding disc rotatable in a rotational direction (R), the seeding disc including a plurality of seeding holes distributed concentrically with respect to the seeding disc along at least one seeding hole circle, and
    an agitator shaft having a recess that extends along the longitudinal axis of the agitator shaft, the recess having an open end and a closed end, wherein
        the agitator shaft (i) is mounted onto a rotatable shaft by receiving the rotatable shaft into the recess through the open end, (ii) is disposed in the holding section, (iii) extends in a radial direction to the seed disc for intensifying movement of the seed within the holding section, thereby providing turbulence of the seed, and (iv) is dismounted from the rotatable shaft to replace the agitator shaft in a modular manner.

2. The seeding heart according to claim 1, wherein the rotatable shaft is a drive shaft coupled to a drive for driving the seeding disc.

3. The seeding heart according to claim 2, wherein the seeding heart further comprises a double ball bearing located in a hollow cylinder formed in a housing half of the seeding heart, said drive shaft rotatably guided by the double ball bearing.

4. The seeding heart according to claim 1, wherein the seeding heart further comprises a housing having an opening, the agitator shaft accessible through the opening for replacement of the agitator shaft.

5. The seeding heart according to claim 1, wherein the seeding heart further comprises a housing having an opening and a cover for closing said opening, the agitator shaft fixed rotatably by the cover in a sealing manner.

6. The seeding heart according to claim 1, wherein the seeding heart further comprises a housing having an opening defined by an inner wall, the agitator shaft including a head dimensioned for congruence with the inner wall.

7. A single-grain seeding machine comprising:
a tank for holding seed; and
a seeding heart including:
- a holding section for holding seed received from the tank,
- a seeding disc rotatable in a rotational direction (R), the seeding disc including a plurality of seeding holes distributed concentrically with respect to the seeding disc along at least one seeding hole circle, and
- an agitator shaft having a recess that extends along the longitudinal axis of the agitator shaft, the recess having an open end and a closed end, wherein
  the agitator shaft (i) is mounted onto a rotatable shaft by receiving the rotatable shaft into the recess through the open end, (ii) disposed in the holding section, (iii) extends in a radial direction to the seed disc for intensifying movement of the seed within the holding section, thereby providing turbulence of the seed, and (iv) is dismounted from the rotatable shaft to replace the agitator shaft in a modular manner.

8. The seeding heart according to claim 2, wherein the drive shaft is coupled to said drive via a bevel gear.

9. The seeding heart according to claim 4, wherein the seeding heart further comprises a hollow cylinder, said drive shaft extending into the hollow cylinder, wherein said opening in the housing is disposed opposite to the hollow cylinder.

10. The seeding heart according to claim 1, wherein said agitator shaft includes a plurality of agitator nubs.

11. The seeding heart according to claim 10, wherein the agitator nubs are disposed at a periphery of the agitator shaft.

12. The seeding heart according to claim 10, wherein the agitator shaft includes a screw for conveying the seed toward the plurality of agitator nubs.

13. The single-grain seeding machine according to claim 7, wherein said agitator shaft includes a plurality of agitator nubs.

14. The single-grain seeding machine according to claim 13, wherein the agitator nubs are disposed at a periphery of the agitator shaft.

15. The single-grain seeding machine according to claim 13, wherein the agitator shaft includes a screw for conveying the seed toward the plurality of agitator nubs.

* * * * *